(12) United States Patent
Winkler et al.

(10) Patent No.: US 7,843,096 B2
(45) Date of Patent: Nov. 30, 2010

(54) METHOD FOR ACCOMODATING AN ELECTRIC MOTOR

(75) Inventors: Wolfgang Winkler, Schutterwald (DE); Josef Foerstera, Buehlertal (DE); Markus Heidrich, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 11/570,997

(22) PCT Filed: Jun. 30, 2005

(86) PCT No.: PCT/EP2005/053105

§ 371 (c)(1),
(2), (4) Date: Dec. 20, 2006

(87) PCT Pub. No.: WO2006/024564

PCT Pub. Date: Mar. 9, 2006

(65) Prior Publication Data
US 2009/0039718 A1 Feb. 12, 2009

(30) Foreign Application Priority Data
Sep. 1, 2004 (DE) ........................ 10 2004 042 271

(51) Int. Cl.
*H02K 5/00* (2006.01)
(52) U.S. Cl. ................... 310/89; 310/52; 310/154.22; 310/64
(58) Field of Classification Search ............... 310/52, 310/89, 154.22, 64, 55, 58
See application file for complete search history.

(56) References Cited

U.S. PATENT DOCUMENTS 3,270,223 A * 8/1966 Seely ........................ 310/62

4,453,097 A 6/1984 Lordo
5,412,267 A 5/1995 Okada et al.

(Continued)

FOREIGN PATENT DOCUMENTS

CN 1035708 9/1989

(Continued)

*Primary Examiner*—Quyen Leung
*Assistant Examiner*—Alex W Mok
(74) *Attorney, Agent, or Firm*—Michael J. Striker

(57) ABSTRACT

The invention relates to a device (10) for accommodating an electric motor (30), particularly a blower motor for a heating or air-conditioning system, comprising an essentially pot-shaped accommodating housing (12) serving as a motor housing and having an accommodating opening (32) in which the pole casing (46) of an electric motor (30) can be inserted while at least partially projecting inside. The inventive device also comprises a retaining flange (14) mounted on the accommodating housing (12) and serving to fasten the motor housing (12) to a supporting element, and comprises a control and regulating unit (20) mounted on the retaining flange (14) and serving to operate the electric motor (30). The invention provides that the accommodating housing (12) has, in the peripheral direction, at least one flattened area (36,40), which differs from a circular shape while corresponds with at least one flattening (54) of an outer contour of the control and regulating unit (20). The invention also relates to an electric motor (30), particularly a direct-current motor having at least two permanent magnetic poles (44) and a pole casing (46) serving as a magnetic return ring and having at least one flattening (55) on the periphery of the pole casing, for use in a device (10) of the aforementioned type.

7 Claims, 2 Drawing Sheets

U.S. PATENT DOCUMENTS

Figure 1:
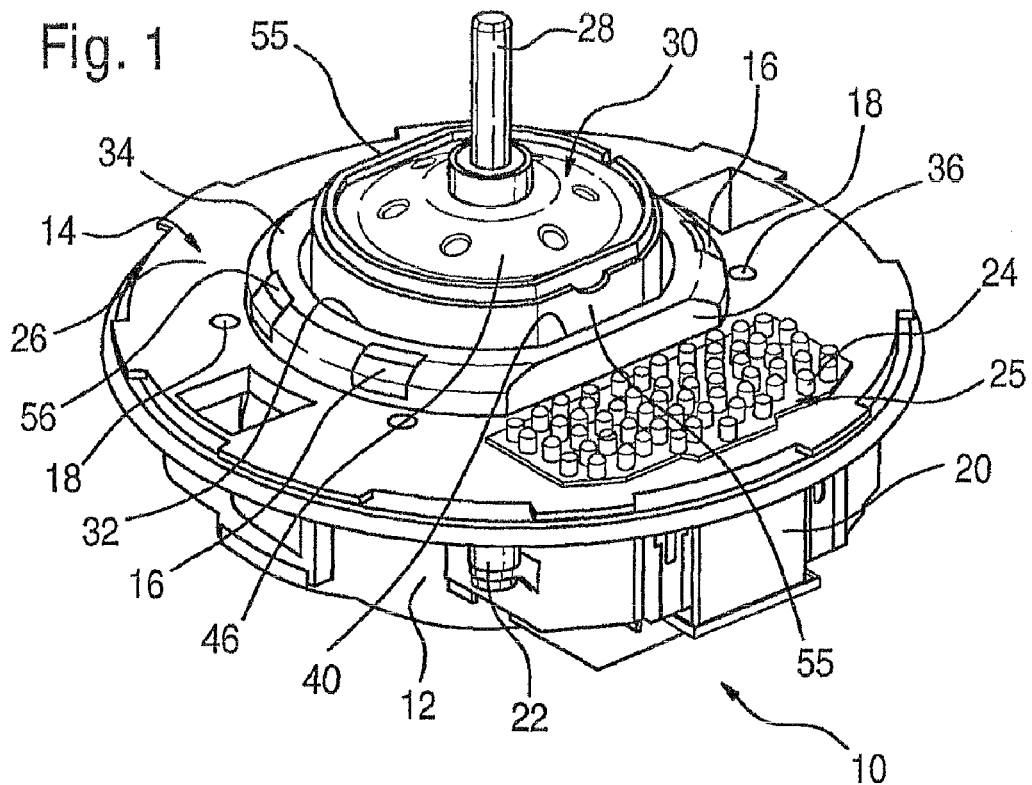

| | | | |
|---|---|---|---|
| 6,291,912 B1 * | 9/2001 | Nadir et al. | 310/64 |
| 6,359,363 B1 | 3/2002 | Foerstera et al. | |
| 6,448,678 B1 | 9/2002 | Simpson | |
| 6,515,389 B1 | 2/2003 | Hartz | |
| 2002/0113505 A1 * | 8/2002 | Takahashi et al. | 310/71 |
| 2003/0184172 A1 * | 10/2003 | Ghiotto | 310/89 |
| 2003/0193251 A1 * | 10/2003 | Long | 310/89 |
| 2003/0230942 A1 * | 12/2003 | Okubo et al. | 310/89 |
| 2004/0108779 A1 | 6/2004 | Boettger et al. | |

FOREIGN PATENT DOCUMENTS

| | | |
|---|---|---|
| DE | 198 45 370 | 4/2000 |
| DE | 101 28 535 | 7/2002 |
| JP | 10-313565 | 11/1998 |
| JP | 10313565 | 11/1998 |
| JP | 11018373 | 1/1999 |
| JP | 2002-522001 | 7/2002 |
| WO | 00/07279 | 2/2000 |

* cited by examiner

METHOD FOR ACCOMODATING AN ELECTRIC MOTOR

CROSS-REFERENCE TO RELATED APPLICATION

The invention described and claimed hereinbelow is also described in German Patent Application DE 10 2004 042 271.0 filed on Sep. 1, 2004. This German Patent Application, whose subject matter is incorporated here by reference, provides the basis for a claim of priority of invention under 35 U.S.C. 119(a)-(d).

BACKGROUND OF THE INVENTION

The present invention relates to a device for accommodating an electric motor, in particular an air conditioner motor or blower motor.

Blower motors for heating and air conditioner blower systems that are used in vehicles, for instance, are as a rule decoupled vibrationally from the vehicle via an accommodating housing, to reduce the transmission of structure-borne sound from the motor or the blower unit to the vehicle body and thus into the vehicle interior.

Present methods for securing such motors for instance comprise inserting the motor into a plastic accommodating housing or metal housing, on which a flange for connecting the accommodating device to an air conditioning system or for fastening it to the body of a motor vehicle, for instance.

From U.S. Pat. No. 6,448,678 B1, a blower motor with an associated accommodating device is known in which, between the blower motor and the accommodating device, a plurality of decoupling elements distributed over the circumference of the motor are located, which come into contact between the pole housing of the electric motor and the inner wall of the accommodating housing, when the electric motor has been inserted into the accommodating housing, and thus damp the motor vibrationally relative to the accommodating housing.

It is thus also known for instance to provide electrical connecting means or also triggering means for controlling and regulating the blower motor to be secured to the flange that serves to secure an accommodating housing to the parts of a heating and air conditioning system that are connected to the vehicle body. Moreover, components of a control and regulating unit for triggering or regulating the blower motor can also be secured to this flange.

SUMMARY OF THE INVENTION

From German Patent Disclosure DE 100 29 188 A1, a blower module is known, which has a recess on its retaining flange for attaching a control part for the blower module. Because of the space required for this kind of control and regulating unit, it is sometimes unavoidable that the flange diameter has to be increased, making it necessary to provide increased space for the installed blower module.

To configure such a blower module in a space-saving way, it is known to adapt the shape of the blower regulator to the shape of the flange of the blower module, so that in this way increasing the flange diameter can be avoided.

From German Patent Disclosure DE 198 95 370 A1, a permanent-magnet-excited small motor is known that serves as a drive mechanism for a motor vehicle power window system and has a rotor, supported rotatably about a pivot axis, that includes a commutator and an armature composed of a lamination packet. In addition, two permanent magnet poles surrounding the armature at diametrically opposed portions are provided, which communicate with one another via a pole housing that annularly surrounds the armature and the permanent magnet poles, so that the magnetic short circuit is guided through the pole housing. The pole housing of the small motor in DE 198 95 370 A1 does not have a constant radius; instead, in the region between the permanent magnet poles, it has regions with a markedly increased radius of curvature, which serve the purpose of flattening a face of the pole housing.

OBJECT OF THE INVENTION

Based on corresponding devices for accommodating an electric motor, in particular a blower motor, of the kind known from the prior art, the object of the invention is to optimize the installation space for such a device, or in other words to reduce it further.

This object is attained by a device for accommodating an electric motor which is designed in accordance with the present invention.

ADVANTAGES OF THE INVENTION

The device for accommodating an electric motor, in particular a blower motor for a heating and air conditioning system, has a substantially cup-shaped accommodating housing, serving as a motor housing, with an accommodation opening into which an electric motor can be inserted protruding at least partway inward. Moreover, a retaining flange for securing the motor housing to a support element, for instance of the air conditioning system connected to the vehicle body, is provided on the accommodating housing.

In the device of the invention, optimizing the installation space for the blower assembly is achieved by providing that the shape of this accommodating housing is adapted to an optimal shape for the control and regulating unit of the blower.

Advantageously, flat faces on the circumference of the accommodating housing of the device of the invention are provided, which lead to a deviation from the normally circular cross-sectional contour of such an accommodating housing. These flat faces correspond with a plane side that is provided on the control and regulating unit of the device of the invention. To that end, the regulating unit has an outer contour with at least one plane or in other words straight side.

This makes a more-accurate fit of the control and regulating unit into the available space of the device for accommodating an electric motor and thus makes a gain in installation space possible. In particular, the regulator contour no longer needs to be adapted to a round circumferential contour of the accommodating housing. Instead, the contour of the accommodating housing and thus consequently the cross-sectional contour of the driving electric motor are adapted according to the invention to the requirements of the regulator.

According to the invention, the control and regulating unit is located in the region of the flat face of the circumferential radius of the accommodating housing of the device for accommodating the electric motor, and in particular at the place where the plane side of the control and regulating unit extends substantially parallel—to the extent that this is possible within the context of production tolerances—to the flat face embodied on the circumference of the accommodating housing.

Because of the flattened and in particular plane design of the outer contour of the accommodating housing, particularly in the region of the motor flange, a virtually rectangular and hence advantageous printed circuit board shape can be used for the control and regulating unit of the device of the invention. It is advantageously possible in this respect to use a printed circuit board for the control and regulating unit that has at least one side which extends substantially parallel to the plane outer contour of the accommodating housing. Because of this kind of virtually rectangular printed circuit board shape, it is possible in assembling the printed circuit board to make better utilization of the printed circuit board surface area.

Because of the embodiment of a flattened outer contour of the accommodating housing, that is, a plane region embodied on the outside of the accommodating housing, a cooling body associated with the control and regulating unit can for instance also be located essentially parallel to the flat region of the accommodating housing. This advantageously makes a greater cooling body surface area possible, with a predetermined diameter of the retaining flange of the device. Achieving a greater cooling body surface area for the regulator of the device of the invention advantageously makes higher thermal utilization of the regulator possible in turn.

Additional installation space on the retaining flange can advantageously be gained by providing that the accommodating housing is eccentric to the center point of the substantially round retaining flange. In particular, the control and regulating unit of the electric motor is located on the side, toward the center of the retaining flange, of the motor shaft of the electric motor to be inserted into the accommodating housing, or in other words in the region of the retaining flange, in which the circumference of the retaining flange is at the greatest possible spacing from the outer contour of the accommodation opening.

In heating and air conditioner motor or blower motors currently used, circular triggering means and pole housing cross sections are employed, so that the definitive space available for their being built into the blower system is defined by the motor diameter and the width of the triggering electronics. Reducing the motor diameter to reduce the installation volume, however, is often subject to limits because of the required electrical motor power levels, so that the motor flange diameters used must be correspondingly large.

An electric motor for the device of the invention is designed as a permanent-magnet-excited motor, and it has a rotor which is rotatably supported about a pivot axis and which includes a commutator and an armature that is composed of a lamination packet. Moreover, at least two permanent magnet poles surrounding the armature at diametrically opposed portions are provided, which are operatively connected to one another via a pole housing that annularly surrounds both the armature and the permanent magnet poles, so that the magnetic short circuit is guided via the pole housing. The electric motor advantageously has a pole housing which has at least one flat face of its circumference, so that the radius of the pole housing cross section is accordingly not constant.

This at least one flat face of the pole housing corresponds to a flat face of the cross section of the accommodating housing of the device of the invention. Advantageously, the at least one flat face of the pole housing is formed by a plane circumferential region of the pole housing that extends between two radial ends of two permanent magnet poles of the blower motor of the device of the invention. The flattened side of the pole housing of the electric motor, in each of which a magnetic gap of the permanent magnet poles is located, is utilized according to the invention in the blower assembly in such a way that the control and regulating unit of the device is placed in this region. In the blower module of the invention, the outer contour of the control and regulating unit extends parallel to this pole housing flat face, in an optimally adapted arrangement.

Advantageously, the flat faces on the circumference of the accommodating housing and on the circumference of the pole housing are located essentially parallel to one another, or in other words to the extent that production tolerances allow. In particular, the accommodating housing of the device of the invention has two flat faces of its circumference that are embodied parallel to one another and that correspond to two corresponding flat faces of the pole housing of the driving motor, or in other words extend substantially parallel to them.

The optimization according to the invention of the installation space of the motor and regulator of a device for accommodating an electric motor makes smaller diameters possible for the device without reducing the power of the driving motor. In this way, additional installation space for the controller and regulator is gained without having to increase the flange diameter of the device of the invention. This conversely makes greater motor power levels possible in the same installation space, since it is no longer the outer diameter of the motor that determines the installation space, but only the size along the flat faces of the motor pole housing.

With the device according to the invention for accommodating an electric motor, in particular a blower motor, and with an electric motor of this kind, in particular a direct current motor with at least two permanent magnet poles and a pole housing serving as a magnetic short circuit, with at least one flat face of the circumference of the pole housing, optimizing the installation space for a blower for a heating and air conditioning system, in particular of a motor vehicle, is advantageously possible. In particular, the area on the retaining flange of such a device that is made available for a triggering means or a regulator is maximized, and the cross-sectional area occupied by the electric motor is minimized, without markedly reducing the power of the electric motor as a result of reducing its external dimensions.

Further advantages of the device of the invention will become apparent from the drawings and the associated description of an exemplary embodiment.

In the drawings, one exemplary embodiment of a device of the invention is shown, which will be explained in further detail in the ensuing description. The drawing figures, their description, and the claims include numerous characteristics in combination. One skilled in the art will also consider these characteristics individually and put them together to make further useful combinations, which are likewise to be considered as disclosed in the context of the description.

BREIF DESCRIPTION OF THE DRAWINGS

Figure 2:
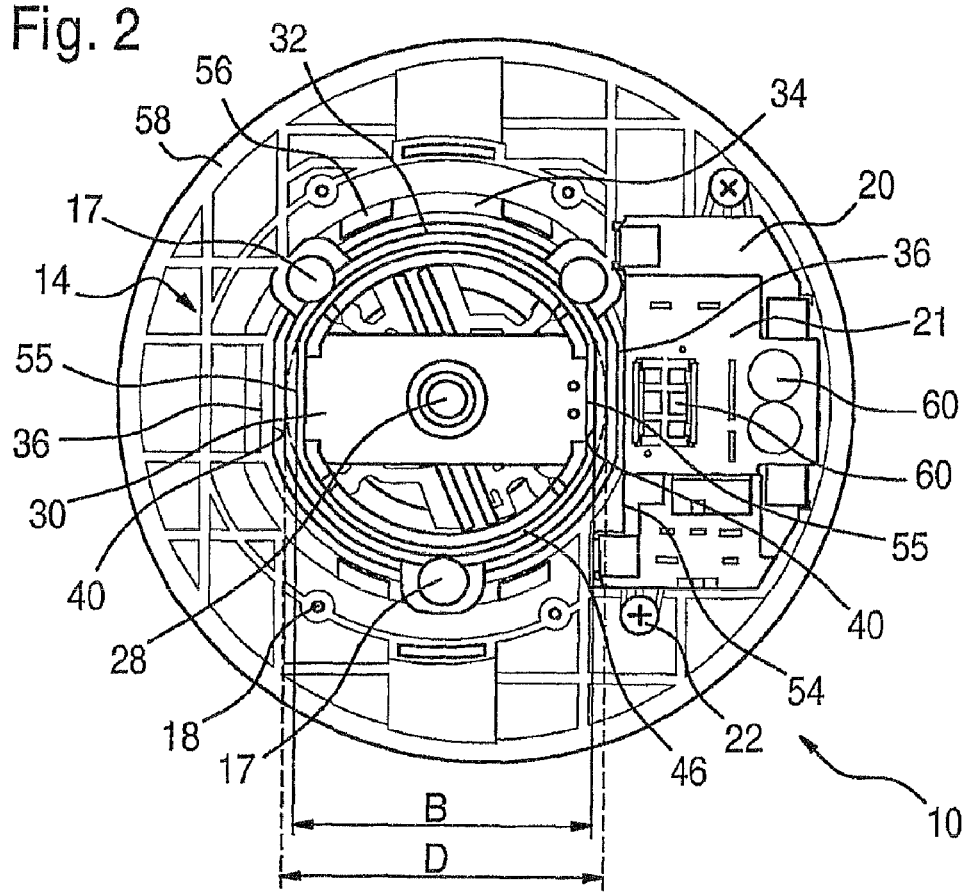
Figure 3:
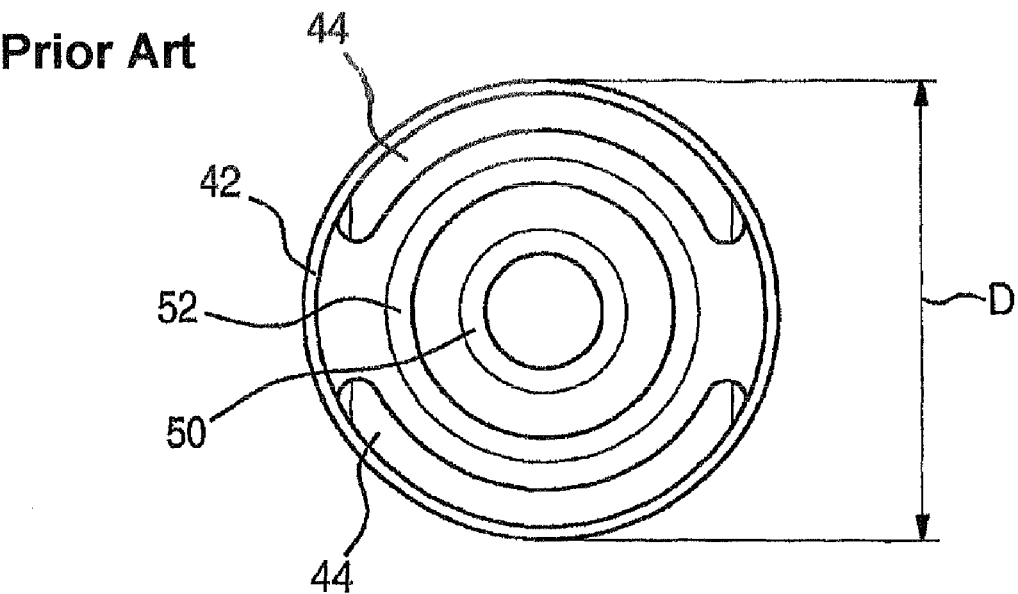
Figure 4:
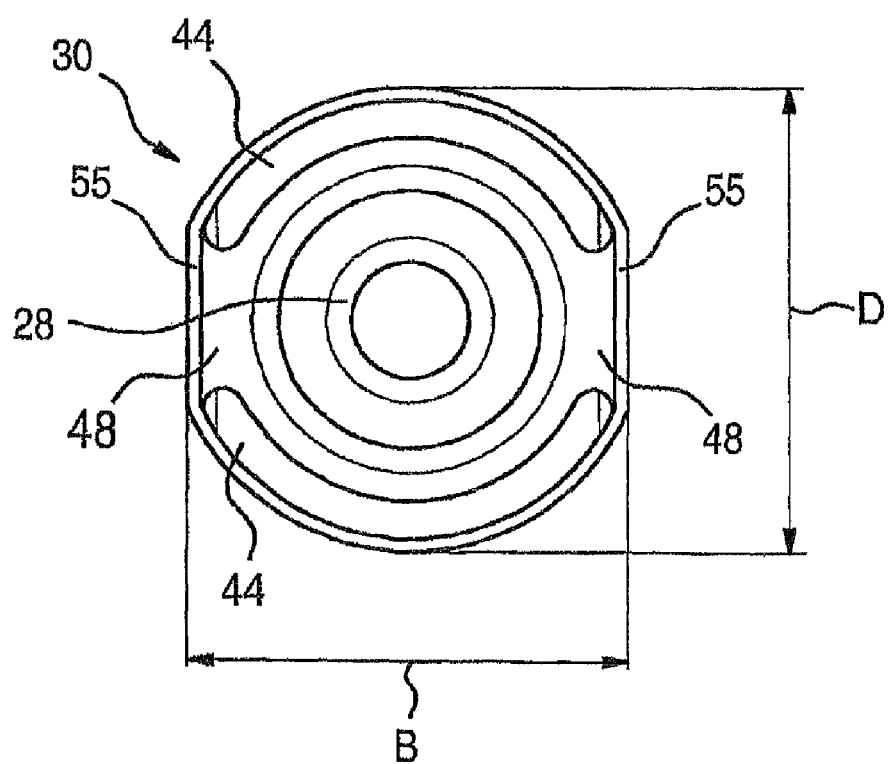

FIG. 1, a perspective view of one exemplary embodiment of a device according to the invention with an electric motor inserted;

FIG. 2, a plan view on the underside of a device of the invention of FIG. 1, with the accommodating housing for the electric motor removed;

FIG. 3, a cross section through the pole housing of an electric motor of the prior art;

FIG. 4, a cross section through an electric motor of the kind used in the device of the invention.

DESCRIPTION OF THE PREFERRED EMBODIMENT

FIG. 1 in a perspective view shows an exemplary embodiment of the device 10 of the invention for accommodating an electric motor, in particular a blower motor for a heating and air conditioning system with an electric motor already inserted.

The device in FIG. 1 has a cup-shaped accommodating housing 12, which on one end is connected to a retaining flange 14 of the device. In the exemplary embodiment of FIG. 1, the accommodating housing and retaining flange are connected to one another by detent elements, that is, detent hooks 16 and corresponding detent openings 56. In other embodiments, the accommodating housing 12 may for instance also be embodied integrally with the retaining flange 15. Other fastening options between the retaining flange and the accommodating housing of the device are understood to be equally possible.

With its retaining flange 14, the device of the invention is integrated into the air conduit of a heating and air conditioning system, for instance of a motor vehicle. To that end, the retaining flange 16 has fastening means, which in the exemplary embodiment of FIG. 1 are shown as through holes 18 in a screw connection.

A control and regulating unit 20, which serves to trigger the electric motor and which sets or regulates its rpm as a function of certain settings of the heating and air conditioning system or of a vehicle engine control unit, is likewise located on and secured to the retaining flange 14 by screws 22. The control and regulating unit has a cooling body 24, which serves to dissipate the lost heat from the electrical components of the control and regulating unit. The control and regulating unit 20 extends through the retaining flange 14 in such a way that the cooling body 24 protrudes with its structured cooling body surface 25 out of the top side 26 of the retaining flange 14. The top side 26 of the retaining flange 16 is the side on which a blower wheel, not shown in FIG. 1 for the sake of clarity, is mounted on the shaft 28 of an electric motor 30. This advantageously means that in operation of the blower, the cooling contour 25 of the cooling body 24 is located in the air stream of the blower, which leads to effective heat dissipation.

The cup-shaped accommodating housing 12, or the retaining flange 14 joined to it, has an accommodation opening 32 through which the electric motor 30 is introduced at least partway into the accommodating housing 12. In the exemplary embodiment of FIG. 1, the accommodation opening 32 is defined by a collarlike annular structure 34, extending all the way around both the accommodating housing 12 and the retaining flange 14, which furthermore serves to secure the motor housing 12 to the retaining flange 16 with the aid of the detent elements described.

The annular structure 34 that defines the accommodation opening 32 is—like the cross section of the accommodating housing 12—not circular; instead, it has one flat region on each of two diametrically sides on both the outer contour of the annular structure and on the inner contour facing toward the interior of the accommodating housing. In the exemplary embodiment of FIG. 1, a first flat region 40 of the accommodation opening 32 or of the accommodating housing 12 is embodied both on the retaining flange 14 and on the wall of the accommodating housing. A second plane region 36 is embodied on the side of the annular structure 34 facing away from the accommodation opening 32. This plane portion 36 corresponds with a plane side 54 of the control and regulating unit 20. In particular, in the exemplary embodiment of FIG. 1, the plane portion of the first flat region 36 of the accommodation opening 32 and the plane side 54 of the control and regulating unit 20 are located substantially parallel to one another. In the final analysis, the parallelism is limited by the production and assembly tolerances involved in the production process of the device of the invention. The first flat region 40 is also located, parallel to the second flat region 36 on the outer contour of the annular structure 34 of the accommodation opening 32, on the inner contour of the accommodation opening 32, oriented toward the interior of the accommodating housing 12. In particular, the first flat region 40 and the second flat region 36 are located parallel to a plane side 54 of the control and regulating unit.

A corresponding flattening of the inner and outer contours of the accommodation opening 32 of the device of the invention is furthermore located on the diametrically opposed side, that is, at an angle of 180° to the first flat face 40 of the accommodation opening 32. The flat faces on the inside of the circumference of the accommodation opening 32 continue over the entire axial length of the accommodating housing 12. The result in the device of the invention is accordingly an accommodating housing which does not have a circular cross section but instead has a plane region 40 and 36, respectively, on two diametrically opposed sides, and these flattened or in other words plane portions of the accommodating housing 12 extend parallel to one another. The cross-sectional contour of the accommodation opening 32 and of the accommodating housing 12 thus has at least two different radii.

Because of the flattened cross-sectional contour of the accommodating housing 12, there is an increase in the free and thus usable flange area, which can advantageously be equipped or filled with a control and regulating unit 20. In particular, it is thus possible to use a greater cooling body surface area 25 for the regulator 20, which in turn makes higher thermal utilization possible for the control and regulating unit 20.

This effect of increased installation space for the control and regulating unit 20 is furthermore enhanced still further because the accommodating housing 12 is located eccentrically to the center point of the substantially circular retaining flange 14, as can be seen clearly from FIG. 2, for instance. The eccentric disposition of the accommodating housing 12 relative to the center point of the retaining flange 14 and the flattened, plane regions 36 and 40 of the cross section of the accommodating housing 12 thus according to the invention make an increased installation space possible for a control and regulating unit, for instance, of an electric motor. Furthermore, because of the inventive design of the cross-sectional contour of the accommodating housing 12, it is possible to use a printed circuit board 21 of virtually rectangular printed circuit board shape for the control and regulating unit 20, so that better utilization can be achieved when assembling the printed circuit board 21.

Upon assembly of the blower, an electric motor 30 is inserted into the accommodating housing 12 of the device 10 of the invention. The electric motor is vibrationally supported relative to the accommodating housing 12 via decoupling elements 17, which in the exemplary embodiment of FIGS. 1 and 2 are embodied as elastic spherical bodies, so that direct contact between the pole housing 46 of the electric motor 30 and the accommodating housing 12 acting as a motor housing exists solely via intermediate vibration-damping bodies. The electric motor, which together with the device of the invention forms essential components of a heating or air conditioner blower, should be modified accordingly because of the changes in the cross-sectional contour of the accommodating housing 12. Typical electric motors used for air conditioner blowers have a substantially circular cross section, that is, a motor geometry of the kind shown highly schematically in FIG. 3. FIG. 3, in a schematic view, shows the cross section of a permanent-magnet-excited electric motor of the kind that has been used until now for cooling and air conditioner blowers.

The cross section D of the pole housing 42 of a standard motor in FIG. 3 is determined essentially by the required power capacity of the electric motor. A permanent-magnet-excited electric motor of this kind has a rotor 52, which is secured to a shaft 50 and supported rotatably about a pivot axis and which includes a commutator and an armature that is composed of lamination packets. Moreover, a plurality of permanent magnet poles 44, in the exemplary embodiment of FIG. 3 two of them, surrounding the armature at diametrically opposed portions, are provided, which are in operative connection with one another via a pole housing 42 annularly surrounding the armature and the permanent magnet poles, so that the magnetic short circuit is guided via the pole housing. The diameter D of the pole housing and thus the essential diameter of the electric motor are essentially determined by the radius of curvature of the permanent magnet poles 44.

Reducing the diameter D is associated with a reduced output power of the electric motor, so that while a smaller electric motor would make a smaller accommodating housing possible and thus additional installation space on the motor flange would be available, nevertheless the attendant reduction in the output power of the electric motor is unacceptable for many applications.

FIG. 4 shows how the installation space for an electric motor can be reduced without substantially restricting the output power of the electric motor. In the region of its permanent magnet poles 44, the electric motor 30, of the kind used in the device of the invention, has the original diameter D. In the region of the magnet gaps 48 that result between the permanent magnet poles 44, however, the pole housing 46 of the electric motor 30 is flattened, and in a deviation from a circular cross-sectional shape, it has one plane region in each case, which extends substantially between the ends of two different permanent magnet poles 44. As a result of this flat face 55, it is possible to reduce the diameter of the pole housing 46 in the region of the magnet gaps 48 to a value B that is less than the diameter D of the electric motor of FIG. 3 that is typically used.

A pole housing 46 of this kind with two flattened sides 55 in the region of the magnet gap 48 has an advantage in terms of installation space for the entire blower, which is defined substantially by the dimensional difference between the diameters D and B; this dimensional difference is all the greater, the smaller the magnetic segment angle α can be designed to be.

In the device of the invention for accommodating an electric motor, the installation space conditions with regard to the motor in particular are determined not by the motor diameter per se but rather by the dimension B between the flattened sides 55 of the motor. For a central installation of the motor 30 relative to the motor flange 16, there is thus a gain of (D-B)/2, which can advantageously be used as a gain in the regulator width, for instance, without increasing the diameter of the motor flange.

If furthermore, as shown in FIG. 2, the electric motor 30 is located eccentrically to the substantially round motor flange 16, then an additional gain in installation space on the motor flange is obtained, which can be utilized for advantageously embodying and mounting the control and regulating unit for the motor.

FIG. 2 shows an exemplary embodiment of a device of the invention for accommodating an electric motor, in a view from below on the motor flange. In the view in FIG. 2, the accommodating housing 12, of the kind shown for instance in FIG. 1, has been removed from the retaining flange 16 for the sake of greater visibility. Only the detent openings 56 are visible, which are embodied in the annular structure 34 of the retaining flange 14. Suitable detent hooks, which are provided on the accommodating housing 12 for the motor in FIG. 1, can be introduced into these detent openings 56, so that the accommodating housing is securely joined to the retaining flange.

The underside 58 of the retaining flange 14 shown in FIG. 2 has electronic components 60 of the control and regulating unit 20 for triggering the electric motor 30. In the view in FIG. 2, it can clearly be seen that the control and regulating unit 20 is located in the region of a flat face 36 of the circumference of the accommodation opening 32, or of the accommodating housing 12 that continues the accommodation opening 32 in the axial direction. The flattened sides 55 of the pole housing 46, which in the view in FIG. 2 corresponds to the version of FIG. 4, extend substantially parallel to a likewise plane side edge 54 of the control and regulating unit 20. In this way, an optimization of the installation space occupied by the electric motor and the regulator 20 is obtained in the device 10 of the invention, and the area made available for the regulator 20, including its cooling body 24, is maximized, and the necessary area for the electric motor 30 is minimized, so that simultaneously a minimization of the outer diameter of the retaining flange can be obtained without impairing the motor power. In this way it would be possible in particular also to attain a greater motor power in the same installation space, since it is not the motor diameter D that determines the installation space, but rather the dimension B, which designates the spacing of the flattened sides 55 of the pole housing 46.

Thus even a greater cooling body area 25 for the control and regulating unit 20 can be employed, so that greater thermal utilization for the electronic components 20 of the control and regulating unit becomes accessible for use. In particular, the design according to the invention of a device for accommodating an electric motor makes it possible to use control and regulating units with printed circuit boards 21 whose shape can be embodied virtually rectangularly over a wide range, so that effective utilization of the printed circuit board surface area by electronic components 60 is made possible. The outer contour of the control and regulating unit can thus advantageously be embodied parallel to the flattening of the pole housing and can be located on the motor flange. Alternatively, the retaining flange diameter of the device of the invention can be reduced markedly, without having to make sacrifices in the required electrical motor power because of a reduction in the motor diameter. With a thus-reduced retaining flange diameter, it is advantageously possible to reduce the required diameter for the spiral blower opening for installation of the blower module in the air conduit of a heating and air conditioning system markedly.

The device of the invention is not limited to the exemplary embodiments shown in the drawings.

The invention claimed is:

1. A device (10) with an accommodated electric motor (30), in particular a blower motor for a heating and air conditioning system, having a substantially cup-shaped accommodating housing (12), serving as a motor housing, with an accommodation opening (32) into which the pole housing (46) of an electric motor (30) is insertable protruding at least partway into it, and having a retaining flange (14), located on the accommodating housing (12), for securing the motor housing (12) to a support element, and having a control and regulating unit (20), located on the retaining flange (14), for operating an electric motor (30), wherein the accommodating housing (12) has at least one flat region (36, 40) in the circumferential direction, which deviates from a circular shape and corresponds with at least one flat face (54) of an outer contour of the control and regulating unit (20), wherein the electric motor has at least two permanent magnet poles (44) and a pole housing (46) embodied as a magnetic short-circuit ring, wherein the pole housing (46) has at least one flat face (55) of its circumference, which corresponds with the flat region (36, 40) of the accommodating housing (12) of the device, wherein the flat faces (36, 40, 55) of the accommodating housing (12) and of the pole housing (46) extend substantially parallel to one another, and wherein the at least one flat face (55) of the pole housing (46) of the electric motor (30) is formed by a plane circumferential region of the pole housing (46) that extends between the ends, facing toward one another, of two permanent magnet poles (44), wherein at least one cooling body (24) is associated with the control and regulating unit (20), and an outer boundary of the cooling body (24) extends substantially parallel to the flat face (36, 40) on the circumference of the accommodating housing (12), and wherein the control and regulating unit (20) extends through the retaining flange (14) in such a way that the cooling body (24) protrudes with its structured cooling body surface (25) out of a top side (26) of the retaining flange (14).

2. The device as defined by claim 1, wherein the control and regulating unit (20) is located in the region of a flat face (36, 40) of the circumference of the accommodating housing (12).

3. The device as defined by claim 1, wherein the flat faces (36, 40, 54) extend substantially parallel to one another from the accommodating housing (12) and the control and regulating unit (20).

4. The device as defined by claim 1, wherein the control and regulating unit (20) has at least one printed circuit board (21), which has at least one side edge (54) that extends substantially parallel to the at least one flat face (36, 40) on the circumference of the accommodating housing (12).

5. The device as defined by claim 1, wherein the accommodating housing (12) for an electric motor (30) is embodied eccentrically to the retaining flange (14).

6. The device as defined by claim 5, wherein the control and regulating unit (20) for an electric motor (30) is located on the side toward the center of the retaining flange (14) of a motor shaft (28) of the electric motor.

7. An electric motor, in particular a direct current motor, having at least two permanent magnet poles (44) and a pole housing (46) serving as a magnetic short-circuit ring, having at least one flat face (55) on the circumference of the pole housing (46), for use in a device as defined by claim 1.

* * * * *